United States Patent
Shyu et al.

(10) Patent No.: US 10,446,045 B2
(45) Date of Patent: Oct. 15, 2019

(54) ASSESSMENT SYSTEM FOR STRUCTURAL CONCEPT LEARNING

(71) Applicant: TamKang University, New Taipei (TW)

(72) Inventors: Hsin-Yih Shyu, Taipei (TW); Yu-Hur Chou, Taipei (TW); Hung-Jen Weng, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 212 days.

(21) Appl. No.: 15/627,609

(22) Filed: Jun. 20, 2017

(65) Prior Publication Data

US 2018/0130366 A1 May 10, 2018

(30) Foreign Application Priority Data

Nov. 10, 2016 (TW) .............................. 105136696 A

(51) Int. Cl.
G09B 7/02 (2006.01)
G09B 7/04 (2006.01)
G09B 19/00 (2006.01)

(52) U.S. Cl.
CPC ............... *G09B 7/04* (2013.01); *G09B 19/00* (2013.01); *G09B 19/0069* (2013.01)

(58) Field of Classification Search
CPC ............... G09B 7/02; G09B 3/08; G09B 3/06
See application file for complete search history.

(56) References Cited

U.S. PATENT DOCUMENTS 8,699,941 B1 * 4/2014 Holt .................. G09B 7/02
434/362

* cited by examiner

*Primary Examiner* — Omkar A Deodhar
(74) *Attorney, Agent, or Firm* — WPAT, PC

(57) ABSTRACT

An assessment system for structural concept learning, which may include a situation interface, a plurality of learning concept units and a concept connection interface. A user can select some of learning concept units according to the information of the situation interface, and use the proposition containers and the relation operators of the concept connection interface to define the connection relation and order relation between the selected learning concept units; after the connection relation and the order relation are compared with the standard situation solution, the comparison can be used to analysis and present the user's structural knowledge learning outcome, such concept mapping.

8 Claims, 3 Drawing Sheets

ASSESSMENT SYSTEM FOR STRUCTURAL CONCEPT LEARNING

CROSS-REFERENCE TO RELATED APPLICATION

This application claims the benefit of Taiwan Patent Application No. 105136696, filed on Nov. 10, 2016, in the Taiwan Intellectual Property Office, the disclosure of which is incorporated herein in its entirety by reference.

BACKGROUND OF THE INVENTION

1. Field of the Invention

The present invention generally relates to an assessment system technology, in particular to an assessment system for structural concept learning.

2. Description of the Related Art

For the purpose of effectively assessing the learning outcome and the misconceptions of students, various learning systems have been developed to solve the above problems, which depend on on-line peer-assisted learning or use an information device to operate concept maps. For example, Taiwan patent publication No.: 1453704 discloses an on-line peer learning system, which provide a learning module for students to learn and discuss with one another, a student relation information determination module and a learning feedback module for information feedback; besides, the relevant results are displayed by a learning progress determination module of the on-line peer learning system.

In addition, Taiwan patent publication No.: 1402786 and U.S. Pat. No. 8,655,260 also disclose a concept map learning system, which include a wireless detection operation device, an information integration platform and a data processing device; the system can create a concept map structure according to the operation results and transfer which into a concept map information for students to learn. Moreover, Taiwan patent publication No.: M467142 discloses an integrated learning diagnosis and feedback support system, which adopts a teaching item bank, a test evaluation system and teaching materials; the test evaluation system can efficiently diagnose students' understanding of the content of the current curriculum, and provide different teaching materials for different students according to their test level in order to reduce their misconceptions.

The above conventional learning systems can achieve great effect on one learning topic; however, students can only understand one specific concept, but cannot understand the relation between different learning topics, not to mention integrating and using several concepts to solve a situation which they really confront.

It is usually to use several kinds of questions to test students in order to understand their learning outcome and then diagnose their misconceptions, such as true-false question, multi-choice question, multi-choice question with more than one answer and fill-in-the-blank, etc. It is very convenient to use the above questions to test students because all of these questions have standard answers. However, for open-type knowledge with structural concept, it is very hard to use the above questions to test students and determine their learning outcome; therefore, it has become an important issue to provide a method capable of help students better their learning outcome and clarify their misconceptions.

SUMMARY OF THE INVENTION

Therefore, it is a primary objective of the present invention to effectively understand students' learning outcome to diagnose their misconceptions and guide their learning direction when they are learning knowledge with structural concept in order to increase their learning efficiency. It is another primary objective of the present invention to help teachers assess the learning condition of students to check whether their teaching methods are effective, and reduce the burden that teachers correct students' learning concepts in open-type questions.

To achieve the foregoing objective, the present invention provides an assessment system for structural concept learning, which may include a learning concept module, a concept operation module and a concept assessment module. The learning concept module may include a plurality of learning concept units operable to assess the learning concept of a user. The concept operation module may select some of the learning concept units, and define the connection relation and the order relation between the selected learning concept units. The concept assessment module may determine whether the connection relation and the order relation between the selected learning concept units are correct.

In a preferred embodiment of the present invention, the concept operation module may include a situation interface and a concept connection interface, and the user may control the connection relation and the order relation between the selected learning concept units in the concept connection interface according to the information of the situation interface.

In a preferred embodiment of the present invention, the assessment system for structural concept learning may further include a learning situation module operable to provide at least one learning situation, and the situation interface of the concept operation module may display a learning concept for testing the user according to the learning situation.

In a preferred embodiment of the present invention, the concept connection interface may include a plurality of proposition containers for containing the learning concept units and a plurality of relation operators operable to define the order of executing the proposition containers.

In a preferred embodiment of the present invention, the learning situation module may further include a situation solution corresponding to the learning situation, and the concept assessment module may compare the situation solution with the connection relation and the order relation between the selected learning concept units contained in the proposition containers in the concept connection interface so as to determine whether the connection relation and the order relation are correct.

In a preferred embodiment of the present invention, the learning concept units may include a physical quantity, a chemical formula, the definition of a term, a pattern, a parameter, an equation, a question or a step.

In a preferred embodiment of the present invention, the proposition containers and the relation operators may be visible when the concept assessment module determines that the connection relation and the order relation between the selected learning concept units contained in the proposition containers, and the relation operators are correct.

In a preferred embodiment of the present invention, the proposition containers and the relation operators may be orderly turned to be visible according to the operation progress of the user in order to provide the user the hint of next learning concept.

In a preferred embodiment of the present invention, the concept connection interface may be a concept map.

In a preferred embodiment of the present invention, the assessment system for structural concept learning may further include a learning feedback module operable to display a comparison of the concept assessment module.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
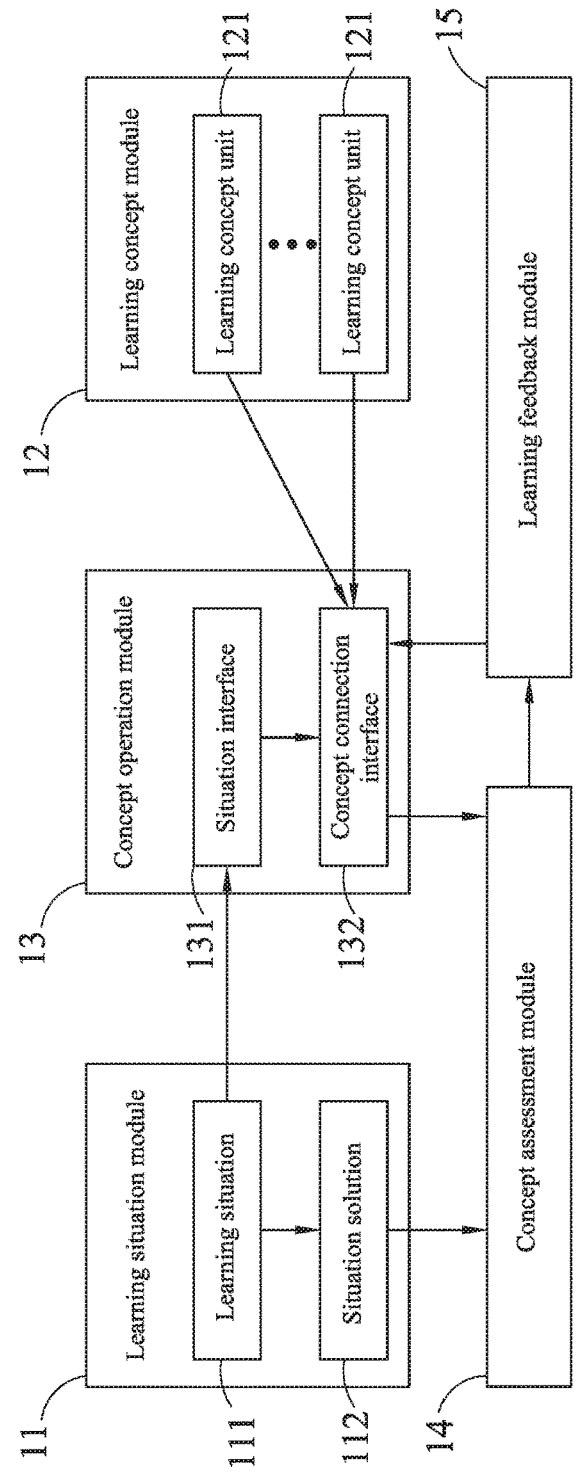
FIG. 1 is a block diagram of a first embodiment of an assessment system for structural concept learning in accordance with the present invention.
Figure 2:
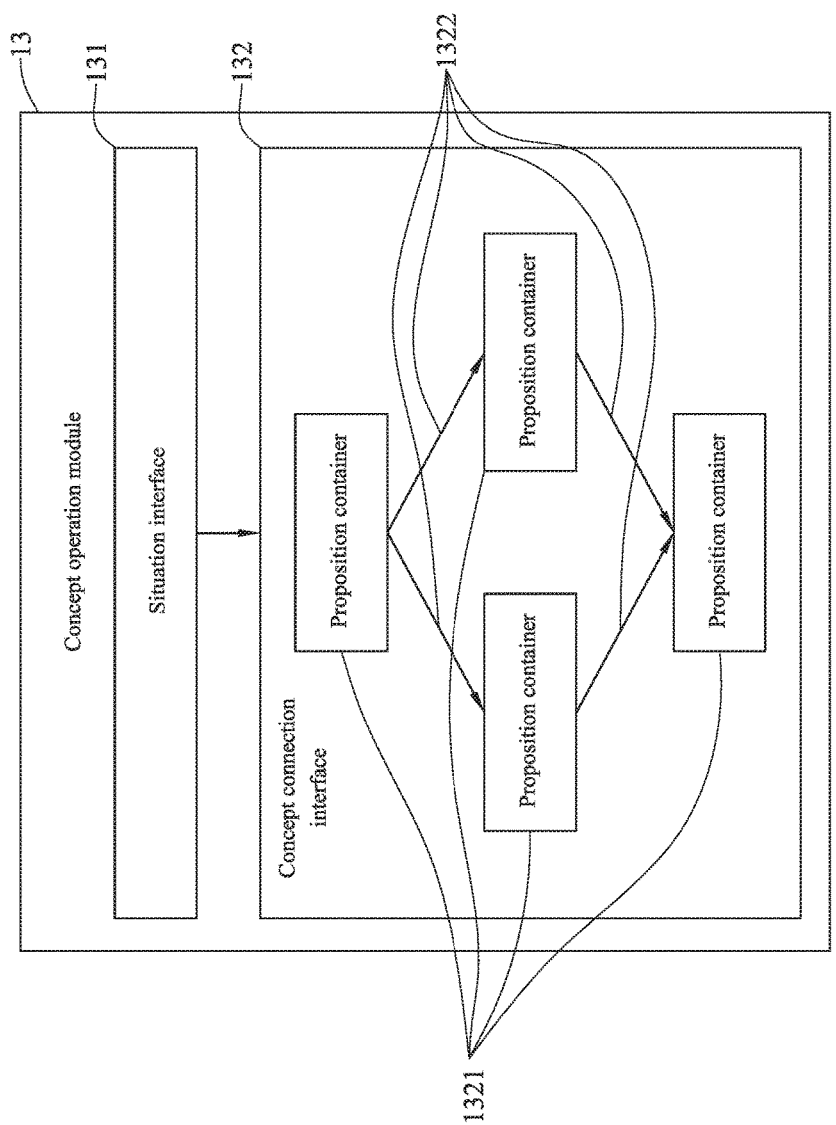
FIG. 2 is a block diagram of a concept operation module of the first embodiment of the assessment system for structural concept learning in accordance with the present invention.

Please refer to FIG. 1 and FIG. 2; FIG. 1 is a block diagram of a first embodiment of an assessment system for structural concept learning in accordance with the present invention; FIG. 2 is a block diagram of a concept operation module of the assessment system for structural concept learning of the embodiment.

As shown in FIG. 1 and FIG. 2, the assessment system for structural concept learning is applicable to an electronic device or a network environment capable of executing application programs; in a preferred embodiment, the electronic device may be a personal computer, a notebook computer, a server or a smart phone, etc. The assessment system for structural concept learning may include a processing module and an input module. The processing module may include a learning situation module 11, a learning concept module 12, a concept operation module 13, a concept assessment module 14 and a learning feedback module 15; a user may operate the learning situation module 11, the learning concept module 12, the concept operation module 13, the concept assessment module 14 and the learning feedback module 15 via the input module; in a preferred embodiment, the processing module may be a processor or the like; the input module may be a touch screen, a keyboard, a mouse or the like.

The learning situation module 11 may include at least one learning situation 111 and a situation solution 112 corresponding to the learning situation 111. The learning situation 111 may be a situation for assessing a learning concept of a student, and the situation solution 112 may be a solution for solving the learning situation 111 by the learning concept.

The learning concept module 12 may include a plurality of learning concept units 121 for assessing the learning concept of the student; each of the learning concept units 121 may include at least one of a physical quantity, a chemical formula, the definition of a term, a pattern, a parameter, an equation, a question or a step.

The concept operation module 13 may include a situation interface 131 and a concept connection interface 132; the information of the situation interface 131 may be selected from the learning situation 111 of the learning situation module 11 so as to assess the learning concept of the student. The concept connection interface 132 may include a plurality of proposition containers 1321 for containing the learning concept units 121 and a plurality of relation operators 1322 for defining the order of executing the proposition containers 1322.

In a preferred embodiment, the student can select which learning concept units 121 are filled in the proposition containers 1321, and the student can also determine the connection relation and the order relation between the selected learning concept units 121 via the relation operators 1322. In a preferred embodiment, the learning concept units 121 and the relation operators 1322 may be visible when the concept assessment module 14 determines that the connection relation and the order relation between the selected learning concept units 121 are correct, which can allow the student to understand whether the selected learning concept units 121, the connection relation and the order relation are correct or not; in this way, the student can thoroughly understand the learning concept.

In a preferred embodiment, the proposition containers 1321 and the relation operators 1322 may be orderly turned to be visible according to the operation progress of the student in order to provide the student the hint of next learning concept.

Figure 3:
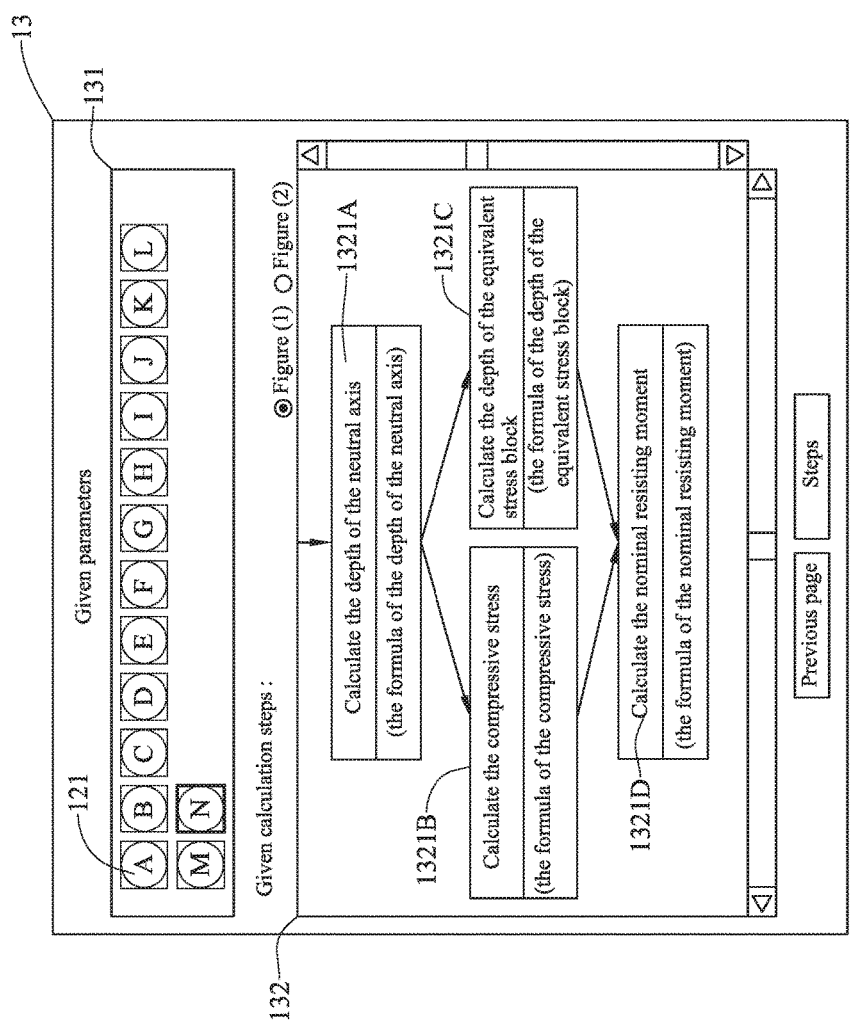
FIG. 3 is a schematic view of a second embodiment of an assessment system for structural concept learning in accordance with the present invention.

Please refer to FIG. 1, FIG. 2 and FIG. 3; FIG. 3 is a schematic view of a second embodiment of an assessment system for structural concept learning in accordance with the present invention. As shown in FIG. 1, FIG. 2 and FIG. 3, the assessment system for structural concept learning may include a learning situation module 11, a learning concept module 12, a concept operation module 13, a concept assessment module 14 and a learning feedback module 15. The concept operation module 13 may display a situation interface 131 and a concept connection interface 132 on an electronic device, such as an electronic display device with touch screen.

The learning situation module 11 may include at least one learning situation 111 and a situation solution 112 corresponding to the learning situation 111; the situation interface 131 of the concept operation module 13 can select some of the information of the learning situation 111, and then display which on the situation interface 131, so the student can understand the situation which should be solved; for example, a civil engineering question about calculating the nominal resisting moment of the rectangular beam with single reinforcement. Besides, the situation solution 112 may include a plurality of position units and a plurality of relation units, and the position units and the relation units can provide the corresponding method and steps for solving the above question. For example, when the student calculates the nominal resisting moment, the position units may be "Calculate the depth of the neutral axis", "Calculate the compressive stress", "Calculate the depth of the equivalent stress block" and "Calculate the nominal resisting moment". In addition, there may be one the relation unit connecting "Calculate the depth of the neutral axis" to "Calculate the compressive stress", and the direction of the relation unit may point from "Calculate the depth of the neutral axis" to "Calculate the compressive stress"; there may be one the relation unit connecting "Calculate the depth of the neutral axis" to "Calculate the depth of the equivalent stress block", and the direction of the relation unit may point from "Calculate the depth of the neutral axis" to "Calculate the depth of the equivalent stress block"; there may be one the relation unit connecting "Calculate the compressive stress" to "Calculate the nominal resisting moment", and the direction of the relation unit may point from "Calculate the compressive stress" to "Calculate the nominal resisting moment"; there may be one the relation unit connecting "Calculate the depth of the equivalent stress block" to "Calculate the nominal resisting moment", and the direction of the relation unit may point from "Calculate the depth of the equivalent stress block" to "Calculate the nominal resisting moment".

The learning concept module 12 may include a plurality of learning concept units 121, such as the length of the cross-section of the rectangular beam with single reinforcement, the width of the cross-section of the rectangular beam with single reinforcement, the coefficient of the equivalent stress block, the total compressive stress, the resisting moment of the beam with single reinforcement, the quantity of the steel bars, the radius of the steel bars . . . , etc. In the embodiment, the learning concept units 121 are displayed by a plurality of learning concept icons, so the student can drag any one of the icons to the concept connection interface 132.

The concept connection interface 132 may include a plurality of proposition containers 1321 and a plurality of relation operators 1322. When one of the learning concept icons is moved to the concept connection interface 132, the learning concept icon is converted into a corresponding learning concept unit 121, and then filled into one of the proposition containers 1321A, 1321B, 1321C and 1321D to be displayed on the concept connection interface 132. For example, the learning concept icon "N" in the embodiment stands for the learning concept "nominal resisting moment"; when the student drags the learning concept icon "N" to the concept connection interface 132, one of the proposition containers 1321A, 1321B, 1321C and 1321D displays the title and the formula of the nominal resisting moment. Similarly, the student can select other learning concept units 121 according to the structural concept for testing shown the situation interface 131.

Afterward, the student can click the initial proposition container 1321A first, and then click the terminal proposition container 1321B to define the connection relation and the order relation of one relation operator 1322; meanwhile, an arrow pointing from the initial proposition container 1321A to the terminal proposition container 1321B is displayed on the concept connection interface 132, which means that the learning concept unit 121 in the initial proposition container 1321A should be executed first before the learning concept unit 121 in the terminal proposition container 1321B is executed in order to solve the learning situation. Similarly, the student can click the initial proposition container 1321A, and then click the terminal proposition container 1321C; next, the student can click the initial proposition container 1321B, and then click the terminal proposition container 1321D; afterward. the student can click the initial proposition container 1321C, and then click the terminal proposition container 1321D; finally, the connection relation and the order relation of all relation operators can be defined the student.

As described above, the student can select any one of the learning concept units 121 by dragging the corresponding learning concept icons into the concept connection interface 132; alternatively, the student can also select any one of the learning concept units 121 by clicking the corresponding learning concept icon and then clicking the concept connection interface 132, or select any one of the learning concept units 121 by other means known by those skilled in the art. Similarly, the student can determine the position and the direction of any one of the relation operators 1322 by dragging it. In another preferred embodiment, the learning concept units 121 may be a physical quantity, a chemical formula, a definition of a term, a pattern, a parameter, an equation, a question or a step; the situation solution 112 may also be a concept map.

It is worthy to point out that the assessment system for structural concept learning of the embodiment may include the learning guidance function. When the student drags the correct learning concept icon, the frame of one of the proposition containers becomes obvious and blinks, which can serve as a hint and encourage the student; on the contrary, when the student drags the wrong learning concept icon, an error message or alarm is incurred; in the way, the student can have lots of fun during the learning process.

In another preferred embodiment of the present invention, the learning feedback module 15 may change the base color or the frame of the correct learning concept units and the relation operators to indicate the correct connection relation, which can further help the teacher clearly understand the student's misunderstandings in the knowledge with structural concept in order to know what the student's misconceptions are.

In another embodiment, the connection relation between the proposition containers and the relation operators are shown by a concept map; moreover, the system can provide the correct learning concept icons for some proposition containers so as to reduce the learning burden of the student.

In summation of the description above, by means of the simulation and practice of different situations, the present invention can definitely help students understand knowledge with structural concept, and assist teachers to make the assessment of their learning outcome.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. An assessment system, applied to an electronic device, for structural concept learning, comprising:
   an input module, and
   a processor, connected to the input module and comprising:
      a learning concept module, comprising a plurality of learning concept units configured;
      a concept operation module, comprising a situation interface and a concept connection interface, wherein a user uses the input module to select some of the learning concept units and control the learning concept units to define a connection relation and an order relation between the selected learning concept units in the concept connection interface according to an information of the situation interface
      a learning situation module, comprises a situation solution; and
      a concept assessment module, configured to determine whether the connection relation and the order relation between the selected learning concept units are correct according to the situation solution; and a learning feedback module, comprising a screen configure to display a comparison of the concept assessment module in order to assess the user's understanding about the learning concept.

2. The assessment system for structural concept learning of claim 1, further comprises a learning situation module configured to provide at least one learning situation, and the situation interface of the concept operation module displays a learning concept for testing the user according to the learning situation.

3. The assessment system for structural concept learning of claim 1, wherein the concept connection interface comprises a plurality of proposition containers for containing the learning concept units and a plurality of relation operators configured to define an order of executing the proposition containers.

4. The assessment system for structural concept learning of claim 2, wherein the situation solution is corresponding to the learning situation, and the concept assessment module compares the situation solution with the connection relation and the order relation between the selected learning concept units contained in the proposition containers in the concept connection interface so as to determine whether the connection relation and the order relation are correct.

5. The assessment system for structural concept learning of claim 3, wherein the learning concept units comprises a physical quantity, a chemical formula, a definition of a term, a pattern, a parameter, an equation, a question or a step.

6. The assessment system for structural concept learning of claim 4, wherein the proposition containers and the relation operators are visible when the concept assessment module determines that the connection relation and the order relation between the selected learning concept units contained in the proposition containers, and the relation operators are correct.

7. The assessment system for structural concept learning of claim 4, wherein the concept connection interface is a concept map.

8. The assessment system for structural concept learning of claim 1, wherein the input module is a touch screen, a keyboard or a mouse.

* * * * *